G. W. EUKER.
SINGLE PHASE COMMUTATOR MOTOR.
APPLICATION FILED AUG. 20, 1907.
902,720.
Patented Nov. 3, 1908.
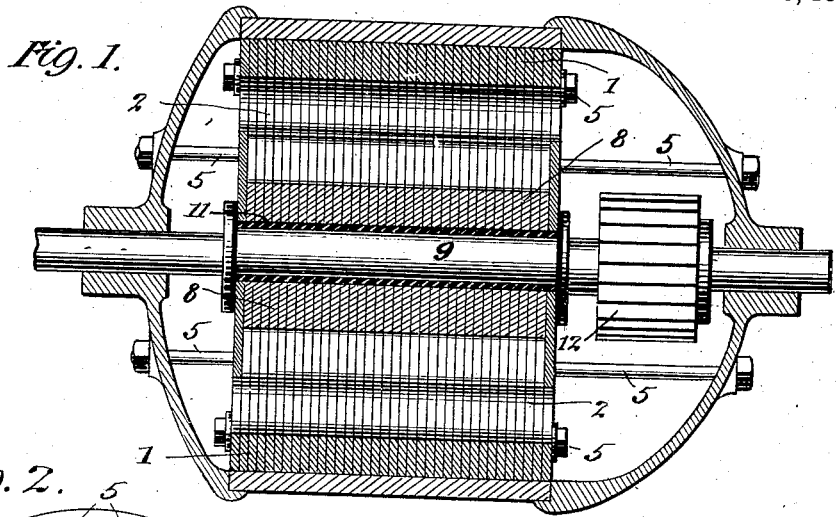
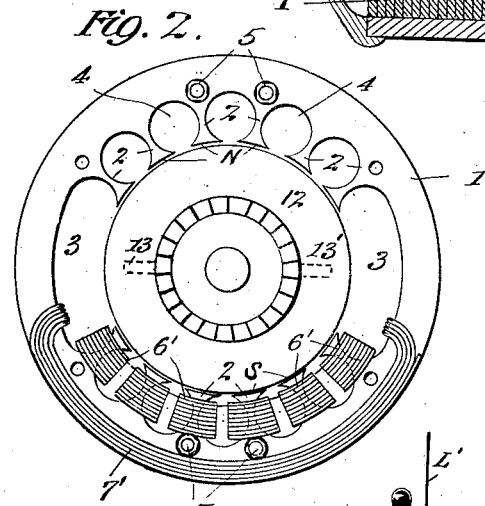
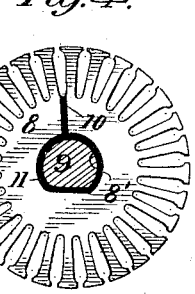
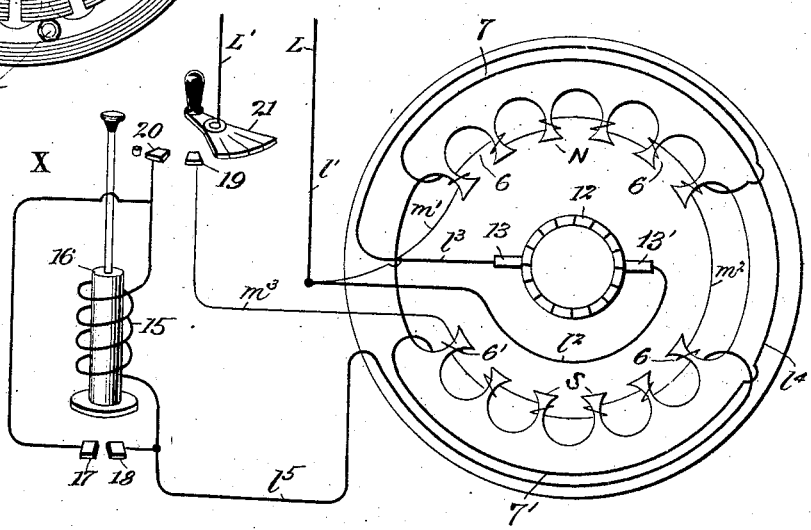
Witnesses:
Frank S. Ober
Inventor
George W. Euker
By his Attorneys
Rosenbaum & Stockbridge

UNITED STATES PATENT OFFICE.

GEORGE W. EUKER, OF BOSTON, MASSACHUSETTS, ASSIGNOR TO DIEHL MANUFACTURING COMPANY, A CORPORATION OF NEW JERSEY.

SINGLE-PHASE COMMUTATOR-MOTOR.

No. 902,720.　　　　Specification of Letters Patent.　　　Patented Nov. 3, 1908.

Application filed August 20, 1907. Serial No. 389,334.

*To all whom it may concern:*

Be it known that I, GEORGE W. EUKER, a citizen of the United States, residing at Boston, in the county of Suffolk and State of Massachusetts, have invented certain new and useful Improvements in Single-Phase Commutator-Motors, of which the following is a full, clear, and exact description.

My invention relates to alternating current motors, particularly of that class or type known as single phase commutator motors in which the structural characteristics are quite analogous to ordinary direct current motors having a series, shunt or compound field, and a closed coil armature with a commutator and brushes in a plane or planes between the poles of the field.

With all single phase motors, it is desirable to have special means for enabling the motor to start up from a state of rest, and various plans have been proposed, such as splitting the phase by inductance and condensers, the use of "shading coils", the use of a commutator with a closed external circuit, or the same with such external circuit connected to the source of current supply. The great difficulty is to get sufficient starting torque to enable the armature to start quickly from a state of rest and come up to its full speed. The last type above mentioned, known as the single phase commutator motor, is extensively used, although difficulty is experienced even with this type in the matter of sufficient initial starting torque. Moreover, the coils of the armature winding during the time they are short-circuited by the brushes, are subjected to a transformer action from the field in addition to the impressed voltage and the voltage due to the dynamic action of rotation, so that heavy local currents are liable to occur, and cause sparking.

In carrying out the present invention, I have aimed to provide a form of single phase commutator motor in which the starting torque is made a maximum and in which sparking at the commutator is reduced to a degree where it is altogether unobjectionable. I also provide for quickly arresting the rotation of the armature when it is desired to stop the motor. The principles of the present invention are equally applicable to large or small motors of the type indicated, the smaller motors operating efficiently at any ordinary frequency, and all sizes operating satisfactorily at lower frequencies, say 15 to 60 cycles. The motors are adapted for use with any ordinary A C circuit and are particularly advantageous in use for running sewing machines, and machines which have to be frequently started and stopped, and run at varying speeds in use. The larger sizes would be adapted for printing presses and railway work.

In the drawings: Figure 1 is a vertical sectional view of a single phase commutator motor embodying the principles of my invention; Fig. 2 is an end view of the same with the casing removed; Fig. 3 is a diagrammatic view showing the windings and the controlling circuits therefor; and Fig. 4 is a detail view showing the construction of one of the armature laminations or disks.

One of the principal causes of sparking in single phase commutator motors is the distortion of the field due to the armature reactions. If the distribution of the field flux is kept uniform under all conditions and suited to the best relative position of the brushes, the sparking is prevented from becoming objectionable. By the present invention this result is accomplished, and in addition the motor is constructed to start and stop quickly, run economically at varying speeds, and be efficient at comparatively high A C frequencies.

Referring to the drawings, 1 indicates the field magnet composed of laminations or rings of generally circular or equivalent outline with inwardly projecting extensions or teeth 2. There are provided a plurality of these inward extensions or teeth grouped together in separate sections, as shown at N and S, such groups or sections being preferably diametrically opposite one another.

I have illustrated the inward extensions or teeth 2 in two diametrically opposite groups. Between the respective groups there are left comparatively wide open spaces 3. The provision of these comparatively wide open spaces 3 constitutes an important feature of my invention.

The form of the various inward extensions or teeth 2 may be modified at will. I have shown the teeth separated by circular grooves or cavities 4.

5 indicates bolts or pins passed through the field disks to secure them together. These bolts or pins 5 may be located at the bases of any selected inward extensions or teeth 2 as shown in the drawing. The inward extensions or teeth are surrounded by magnet coils or windings, denominated 6 and 6' in the drawing, the convolutions of which pass through the various openings 4. All of the coils of a given group or section are connected to be traversed by a current in the same direction, so that each of the teeth of such group or section are energized with the same polarity. The connections between adjacent groups are such as to energize them to alternate polarity. In the form of the invention shown, where there are two diametrically opposite groups N and S, it is evident that the equivalent of a single field with two consequent poles (alternating north and south) is formed.

In addition to the windings 6, 6', which may be connected together in a single circuit, there are additional windings 7, 7', curved or formed to surround all of the various inward extensions or teeth 2 of each group N and S, and coöperating with the windings 6, 6', in the energization of such teeth or extensions. The coils 7 may be connected in a single circuit with one another, and in practice I put this circuit in series with the armature, the windings 6, 6', being in a separate or shunt circuit.

A practical feature of the construction lies in the arrangement by which the pins 5 serve to support the coils 7 in their curved form extending around the respective groups of the teeth or extensions 2.

The armature may be of any suitable or desired construction of the closed coil type. In Fig. 4, a preferred form of disk or lamination 8 for the armature is illustrated. It will be observed that the disk has a central opening 8' of segmental or non-circular outline communicating with the radial slot 10. 11 indicates insulating material in the slot 10 and within the opening 8', by which the disks or laminations are prevented from forming a closed circuit, and also are kept insulated from the armature shaft 9. The provision of this insulation is a matter of the highest importance, as it opens the magnetic and electric circuit and prevents induction currents which might otherwise occur under the varying magnetic influences to which these disks are subjected. The form of the laminations 8 having a single slot 10 is particularly advantageous because they are complete and self-supporting without any end plates, or bolts, or other connecting or holding means. The form of the shaft 9 coöperates in giving a maximum strength to the support of the laminations, since the flattened side of the shaft 9 is substantially diametrically opposite the slot 10, so that the turning forces which are applied at the edges of the flattened side of the shaft, are received by the laminations at the points where they are strongest, rather than near the slot where they are necessarily weakened. The armature has an ordinary commutator 12 with segments corresponding to the number of coils. 13, 13', indicate brushes diametrically opposite one another in planes between the planes of the poles N amd S.

The circuits of the above are particularly shown in Fig. 3. L and L' indicate line connections or sources of A C supply from which a series circuit may be established through the armature and through the windings 7 as follows: wire $l'$, wire $l^2$, brushes 13', 13, wire $l^3$, winding 7, wire $l^4$, winding 7', wire $l^5$, through certain circuit controlling devices broadly designated X, and back to line wire L'. A shunt connection is also established from line wires L, L', through wire $l'$, wire $m'$, windings 6, wire $m^2$, windings 6', wire $m^3$, also through circuit controlling device X, back to wire L'.

The circuit controlling device X is designed to close the shunt circuit last described before the series circuit is completed, and to gradually cut out inductance from the series circuit, so that the full current strength is not immediately attained therein. A practical form of circuit controlling mechanism for this purpose is fully illustrated and described in my companion application, Serial No. 390,322 filed herewith, and I have accordingly only diagrammatically illustrated the principles thereof in this case. 15 indicates an inductance winding, and 16 a paramagnetic core therein which is movable so as to change the inductance of the winding. 17 and 18 are contacts which are bridged or connected when the core 16 is moved to a position giving the least inductance of the winding 15. 19 and 20 are contacts which are successively put in connection with the line wire L' by a switch device 21. The arrangement is such that the connection 19 is always connected first and disconnected last from the source of current supply. Under these circumstances, the alternating current passes through the shunt winding 6, 6', before the circuit of the armature is closed. The field is therefore allowed to come to its full normal cycle of alternating magnetization unimpeded by armature reactions due to impressed or induced current therein. Immediately afterward, the circuit of the armature is closed through the inductance 15 which is at a maximum on account of the position of the core 16. At this time, the armature reactions do not oppose the current flow, so that normal current passes, and as the field is strongly energized as described, the motor starts very abruptly and with a maximum starting torque. Thereafter the core 16 may be lowered rapidly so as to reduce the inductance of the winding 15 and finally the core bridges the contact 17 and 18, cutting out the winding 15 altogether. By this time, the motor has arrived at full speed and is operating normally. Similarly when it is desired to stop the motor, the armature is wholly disconnected from the circuit before the field is disconnected, so that the energized field exercises a strong dynamic braking action on the armature.

At all times sparking is reduced to a minimum, since the virtual sub-division of the field magnet poles into small elements absolutely insures a substantially uniform magnetization and precludes the field density becoming excessive at one side or the other. As the commutator brushes are adjusted to the best position with a uniform field, it is clear that excessive sparking will not occur by reason of any change in the form of the field. Under these circumstances, and by virtue of the wide gaps 3 between the ends of the poles, sparking is practically reduced so as to be unobjectionable. Another practical point is that the sub-division of the shunt magnet windings in the manner illustrated is such that the extra currents of adjacent coils tend to neutralize one another, so that the self-inductance of the field is very much less and its energization is very much greater than it would otherwise be. The alternating magnetization of the small polar sub-divisions is accomplished with greater rapidity and with less expenditure of energy than if larger iron masses were employed. In this way, the field and armature of the motor balance one another quite closely in their reciprocal action, which is a matter of the highest importance in all alternating current motors.

The particular details of the arrangement shown may, of course, be modified without departing from the spirit and scope of my invention. For example, it would be possible to vary the arrangement or location of the series winding, or omit this winding altogether, but I find that its use, as shown, is advantageous in the operation of the motor.

What I claim, is:—

1. A single phase commutator motor comprising an armature, a field magnet having a pair of consequent poles each of which is symmetrically divided into subdivisions, series windings for the respective poles surrounding all of the subdivisions thereof, and separate serially connected windings for each of said subdivisions, said windings being included in a single shunt circuit with the armature.

2. A single phase commutator motor comprising an armature, a field magnet having a pair of consequent poles each of which is made up of a plurality of subdivisions formed by a row of equally spaced circular longitudinally extending holes or perforations, series windings for the respective poles surrounding all of the subdivisions thereof collectively, and separate independent windings for each of said subdivisions and included in a single shunt circuit with the armature.

3. A single phase commutator motor comprising an armature, a field magnet having consequent poles each of which is made up of a plurality of separate elements or subdivisions, separate independent windings for each of said subdivisions and included in a single shunt circuit with the armature, and series windings embracing all of the subdivisions of each pole and extending in paths around the outside edges of the field diametrically beyond the exposed ends of said shunt windings.

4. A single phase commutator motor comprising an armature, a field magnet having poles each of which is made up of a plurality of separate elements or subdivisions, separate independent windings for each of said elements or subdivisions and included in a single shunt circuit with the armature, and a pair of windings in series with the armature and with one another and each surrounding all of the subdivisions of said respective poles collectively.

5. In a single phase commutator motor, an armature having disks or laminations each comprising a complete ring with one radial slot, and a shaft having a non-circular outline in one side only, said shaft having a coöperating engagement with said laminations at its non-circular portion to prevent their independent rotation, said portion being located substantially diametrically opposite the slots of the laminations, whereby the turning forces on the laminations are received at the points of their greatest strength.

In witness whereof, I subscribe my signature, in the presence of two witnesses.

GEORGE W. EUKER.

Witness:
WALDO M. CHAPIN,
WM. M. STOCKBRIDGE.